United States Patent
He et al.

(10) Patent No.: US 10,191,480 B2
(45) Date of Patent: Jan. 29, 2019

(54) METHOD AND SYSTEM OF CLOSE-LOOP ANALYSIS TO ELECTRONIC COMPONENT FAULT PROBLEM

(71) Applicant: FIFTH ELECTRONICS RESEARCH INSTITUTE OF MINISTRY OF INDUSTRY AND INFORMATION TECHNOLOGY, Guangzhou, Guangdong (CN)

(72) Inventors: Xiaoqi He, Guangdong (CN); Ping Lai, Guangdong (CN); Yunfei En, Guangdong (CN); Yuan Chen, Guangdong (CN); Yunhui Wang, Guangdong (CN)

(73) Assignee: FIFTH ELECTRONICS RESEARCH INSTITUTE OF MINISTRY OF INDUSTRY AND INFORMATION TECHNOLOGY, Guangzhou, Guangdong (CN)

( * ) Notice: Subject to any disclaimer, the term of this patent is extended or adjusted under 35 U.S.C. 154(b) by 0 days.

(21) Appl. No.: 15/867,111

(22) Filed: Jan. 10, 2018

(65) Prior Publication Data
US 2018/0136640 A1 May 17, 2018

Related U.S. Application Data

(63) Continuation of application No. 14/351,865, filed as application No. PCT/CN2013/086159 on Oct. 29, 2013, now abandoned.

(30) Foreign Application Priority Data

Nov. 30, 2012 (CN) .......................... 2012 1 0511020

(51) Int. Cl.
*G01M 99/00* (2011.01)
*G06F 11/07* (2006.01)
(Continued)

(52) U.S. Cl.
CPC ....... *G05B 23/0248* (2013.01); *G01M 99/008* (2013.01); *G05B 23/0251* (2013.01);
(Continued)

(58) Field of Classification Search
None
See application file for complete search history.

(56) References Cited

U.S. PATENT DOCUMENTS 7,500,143 B2 * 3/2009 Buia ....................... H04L 12/66
714/26
7,856,575 B2 * 12/2010 Bock .................. G06F 11/0748
714/26
(Continued)

FOREIGN PATENT DOCUMENTS

CN 1553328 12/2004
CN 101479705 A 7/2009
(Continued)

OTHER PUBLICATIONS

Boppana, V., et al. "Full Fault Dictionary Storage Based on Labeled Tree Encoding." Proceedings of 14th VLSI Test Symposium, doi:10.1109/vtest.1996.510854.*

(Continued)

*Primary Examiner* — Joseph Schoenholtz
(74) *Attorney, Agent, or Firm* — Tim Tingkang Xia, Esq.; Locke Lord LLP

(57) ABSTRACT

Method and system for performing close-loop analysis to electronic component failures are provided. The system establishes an electronic component fault tree of physics of failure (FTPF), converts the FTPF into a failure locating fault tree, establishes an electronic component fault dictionary with the cause of failure mechanism corresponding to failure characteristics, and performs close-loop analysis to the electronic component according to the fault tree and the
(Continued)

fault dictionary. According to the disclosure, it is possible to locate the electronic component fault in the internal physical structure by the failure locating fault tree, to give a clear failure path, to quickly identify the failure mechanism corresponding to the electronic component failure mode by analyzing the failure characteristic vector in the fault dictionary, and to determine the mechanism factors and influencing factors of relevant failure mechanism by the FTPF, thereby achieving fast and accurate locating and diagnosis for the electronic component failure.

4 Claims, 4 Drawing Sheets

(51) Int. Cl.
    *G05B 23/02*     (2006.01)
    *G06F 17/18*     (2006.01)

(52) U.S. Cl.
    CPC ...... *G05B 23/0272* (2013.01); *G06F 11/0706* (2013.01); *G06F 11/079* (2013.01); *G06F 17/18* (2013.01)

(56) References Cited

U.S. PATENT DOCUMENTS

| | | | |
|---|---|---|---|
| 9,430,315 B2 * | 8/2016 | He | G05B 23/0248 |
| 2004/0078736 A1 | 4/2004 | Liggesmeyer et al. | |
| 2009/0300418 A1 | 12/2009 | Klein et al. | |
| 2015/0168271 A1 | 6/2015 | He et al. | |

FOREIGN PATENT DOCUMENTS

| | | |
|---|---|---|
| CN | 101846992 | 9/2010 |
| CN | 103020436 A | 4/2013 |

OTHER PUBLICATIONS

International Search Report and Written Opinion for Application No. PCT/CN2013/086159 dated Feb. 13, 2014.
First Office Action for Parent U.S. Appl. No. 14/351,365, dated Apr. 11, 2017.
Second Office Action for Parent U.S. Appl. No. 14/351,865, dated Jun. 27, 2017.
Third Office Action for Parent U.S. Appl. No. 14/351,865, dated Oct. 10, 2017.
Pan et al., "Study on Fault Diagnosis of Circuit Board Based on Fault Tree Analysis Method" Journal of Gun Launch & Control, vol. No. 1, pp. 63-67, 2009.
Wang et al., "Study on HgCdTe Detector Assemble Fault Tree and Failure Analysis" Semiconductor Optoelectronics vol. 33., No. 5., pp. 627-631, Oct. 2012.
Qu et al. "Simulation Study of Multi-Fault Diagnosis of Flying-controlled Box in the Autopilot Based on Elman Neural Network", Aircraft Design, vol. 28, No. 2, pp. 62-66, Apr. 2008.
Jiang et al., "An Integrated Diagnostic Method of Missile Support Equipment Based on Fuzzy FTA and Fault Disctinoary", Instrumentation Technology, No. 6, pp. 4-6, 2010.
Vesely, W., "Fault Tree Analysis(FTA): Concept and Applications" Mar. 11, 2013.

* cited by examiner

METHOD AND SYSTEM OF CLOSE-LOOP ANALYSIS TO ELECTRONIC COMPONENT FAULT PROBLEM

CROSS-REFERENCE TO RELATED APPLICATIONS

This application is continuation application of U.S. patent application Ser. No. 14/351,865, filed Apr. 14, 2014, which is a U.S. national stage entry of international application No. PCT/CN2013/086159, filed Oct. 29, 2013, which itself claims the priority to Chinese application No. CN201210511020.6 filed Nov. 30, 2012, which are incorporated herein by reference in their entireties.

FIELD OF THE INVENTION

The present disclosure relates generally to the field of fault diagnosis, and more particularly, to a method and system of close-loop analysis to electronic component fault problem.

BACKGROUND OF THE INVENTION

The aim of close-loop analysis to electronic component fault problem is to locate failure and determine the failure mechanism by failure analysis, to propose improvements according to the cause of failure, and thus to achieve the fault problem close-loop. That is, the requirements of "accurate locating, clear mechanism, and effective improvement measures" to the fault problem can be meet, and a fault tree for the electronic component can be established. To achieve the close-loop of electronic component fault problem, a variety of techniques are used. However, most of the existing techniques of electronic component failure analysis are those of failure phenomenon observation, which lack of analysis technology to the failure information, and the resulted conclusion of close-loop to electronic component fault problem are related to one's analysis experience. Thus, the key to close-loop analysis of electronic component fault problem lies in the following aspects: performing close-loop analysis by systematically applying the failure observations and failure information, achieve the "accurate locating" giving the failure site and failure path inside an electronic component, achieve the "clear mechanism" giving the mechanism cause leading to the electronic component failure, and so achieve the "effective improvement measures" proposing effective improvement measures to the cause of a mechanism.

Fault tree analysis is a logical reasoning method for analysis of system reliability and safety. By analyzing and determining the logical relations from a variety of possible factors that may lead to failures, the causes of system failure can be identified using this method, which has been widely used in the field of aerospace and electronics systems, etc. In order to meet the requirements of the close-loop to electronic component fault problem, starting from the beginning of this century, fault tree analysis is gradually applied to electronic components to perform close-loop analysis by learning the electronic equipment fault tree analysis. The current problem to be solved is how to establish the electronic component fault tree. Electronic components, as basic discrete devices or physical entities in an electronic system, are packaged individually and can be classified into passive, active, or electromechanical components, including semiconductor integrated circuit, hybrid integrated circuit, or thick film device. Compared to the internal fault problems of the electric equipment, it is almost impossible to measure an internal fault problem of an electronic component directly; the failure mechanism can only be determined by analyzing characteristic parameters and conducting destructive observation to the electric components. In this regard, how to make the failure event of the internal structure of an electronic component (e.g. failure mechanism) measurable and recognizable is one of the difficulties in establishing a fault tree for electronic components and performing close-loop analysis for electronic component fault problem.

In this regard, the fault dictionary method is an effective method to rapidly locate the fault of electronic equipment. The fault dictionary created should be able to reflect the relationship between the cause of the fault of the measured object and the measurable external parameters of the equipment. The event information of fault tree is usually used to establish this type of relationship.

The use of fault tree and fault dictionary method for fault diagnosis and fault problem close-loop analysis has the above advantages. Thus, for general electronic equipment, the fault tree and fault dictionary method are usually used to perform fault diagnosis and fault problem close-loop analysis. But for electronic components, due to the variety of failure modes of electronic components and the complexity of the failure mechanism, the failure diagnosis and fault problem close-loop analysis using the existing fault tree and fault dictionary method cannot accurately perform the failure locating and analyzing to electronic component.

SUMMARY OF THE INVENTION

To address the aforementioned deficiencies and inadequacies, there is a need to provide a method and system for performing close-loop analysis to electronic component failures, which can perform rapid diagnosis and accurate locating to electronic component failures.

According to an aspect of the present invention, a method for performing close-loop analysis to electronic component failures includes the steps of:

establishing, according to common characteristics of electronic component's physics of failure, an electronic component fault tree of physics of failure;

converting an event of physics of failure into an observable node event according to the fault tree of physics of failure, thus converting the fault tree of physics of failure into a failure locating fault tree;

establishing, according to the failure locating fault tree, an electronic component fault dictionary with the cause of failure mechanism corresponding to failure characteristics;

performing close-loop analysis to the electronic component fault problem according to the fault tree of physics of failure and the component fault dictionary.

In one embodiment, the common characteristics of electronic component's physics of failure include: fault object, failure mode, failure site, failure mechanism, mechanism factor, and influencing factor.

In one embodiment, the step of converting the fault tree of physics of failure into a failure locating fault tree further includes:

determining the observable node between a failure mode and a failure mechanism, and representing an immeasurable event of physics of failure by an observable node event;

selecting, according to the structure and performance characteristics of the electronic component, the observable characteristic parameters representing each node, including:

electrical, thermal, and mechanical properties, the appearance characteristics, hermeticity, and environmental adaptation;

representing an electronic component failure event by a node failure event, and representing the node failure event by the observable parameters; and establishing an failure locating fault tree of an electronic component, the component failure locating fault tree having the failure mode as top event, the observable node as intermediate event, and the failure mechanism as bottom event.

In one embodiment, the step of establishing, according to the failure locating fault tree, an electronic component fault dictionary with the cause of failure mechanism corresponding to failure characteristics further includes:

determining, according to the failure locating fault tree, a set of electronic component failure modes, the set including multiple subsets of failure mode;

determining, according to the failure locating fault tree, the observable node for each failure mode in the subset of failure modes;

obtaining, according to the failure locating fault tree, observed parameters from the observable node, judging the parameters and obtaining the characteristic value;

determining, according to the characteristic value of the observable node, the failure mechanism characteristic vector of the electronic component;

determining, according to the failure locating fault tree, the cause of failure mechanism of the electronic component; and establishing, according to the cause of failure mechanism and the characteristic value of the observable node, the electronic component fault dictionary with the cause of mechanism corresponding to failure characteristics.

In one embodiment, the step of performing close-loop analysis to the electronic component fault problem, according to the fault tree of physics of failure and the component fault dictionary further includes:

observing the electronic component, according to the node parameters of the electronic component fault dictionary, and obtaining characteristic value of an observed vector;

comparing the characteristic value of the observed vector to the electronic component fault dictionary, then determining the cause of failure mechanism of the electronic component;

looking for, according to the cause of failure mechanism, the corresponding mechanism factors and influencing factors in the fault tree of physics of failure, so as to propose control measures against the failure mechanism.

According to another aspect of the present invention, a system for performing close-loop analysis to electronic component failures includes:

a fault tree of physics of failure establishing module, configured to establish, according to common characteristics of electronic component's physics of failure, a fault tree of physics of failure of the electronic component;

a failure locating fault tree establishing module, configured to convert an event of physics of failure into an observable node event according to the fault tree of physics of failure, and to convert the fault tree of physics of failure into a failure locating fault tree;

a fault dictionary establishing module, configured to establish, according to the failure locating fault tree, an electronic component fault dictionary with the cause of failure mechanism corresponding to failure characteristics; and a close-loop analyzing module, configured to perform close-loop analysis to the electronic component fault problem according to the fault tree of physics of failure and the electronic component fault dictionary.

In one embodiment, the common characteristics of electronic component's physics of failure include: fault object, failure mode, failure site, failure mechanism, mechanism factor, and influencing factor.

In one embodiment, the failure locating fault tree establishing module further includes:

an event converting unit, configured to determine an observable node between a failure mode and a failure mechanism, and to represent an immeasurable event of physics of failure by an observable node event;

a characteristic parameters selecting unit, configured to select, according to the structure and performance characteristics of the electronic component, the observable characteristic parameters representing each node, including: electrical, thermal, and mechanical properties, the appearance characteristics, hermeticity, and environmental adaptation;

a parameter representing unit, configured to represent an electronic component failure event by a node failure event, and to represent the node failure event by the observable parameters; and a fault tree establishing unit, configured to establish an failure locating fault tree of an electronic component, the failure locating fault tree having the failure mode as top event, the observable node as intermediate event, and the failure mechanism as bottom event.

In one embodiment, the fault dictionary establishing module further includes:

a set of failure modes determining unit, configured to determine, according to the failure locating fault tree, a set of failure modes of the electronic component, the set including multiple subsets of failure modes;

an observable node determining module, configured to determine, according to the failure locating fault tree, the observable node for each failure mode in the subset of failure modes;

a characteristic value obtaining unit, configured to obtain, according to the failure locating fault tree, observed parameters from the observable node, and judging the parameters to obtain the characteristic value;

a characteristic vector obtaining unit, configured to determine, according to the characteristic value of the observable node, the failure mechanism characteristic vector of the electronic component;

a failure mechanism determining unit, configured to determine, according to the failure locating fault tree, the cause of failure mechanism of the electronic component;

a fault dictionary establishing unit, configured to establish, according to the cause of failure mechanism and the characteristic value of the observable node, the electronic component fault dictionary with the cause of failure mechanism corresponding to failure characteristics.

In one embodiment, the close-loop analyzing module further includes: an observing unit, configured to observe the electronic component according to the node parameters of the electronic component fault dictionary, and to obtain a characteristic value of an observed vector;

a comparing unit, configured to compare the characteristic value of the observed vector and the electronic component fault dictionary, then to determine the cause of failure mechanism of the electronic component;

a look-up unit, configured to look for, according to the cause of failure mechanism, the corresponding mechanism factors and influencing factors in the fault tree of physics of failure, so as to propose control measures against the failure mechanism.

By the method and system for performing close-loop analysis to electronic component failures of the present disclosure, it is possible to locate the electronic component fault in the internal physical structure by the failure locating fault tree, to give a clear failure path, to quickly identify the failure mechanism corresponding to the electronic component failure mode by analysis of failure characteristic vector of the fault dictionary, and to determine the mechanism factors and influencing factors of relevant failure mechanism by the fault tree of physics of failure. Thus, targeted failure control measures are proposed to achieve fast and accurate locating and diagnosis to the electronic component failure.

DETAILED DESCRIPTION OF THE PREFERRED EMBODIMENTS

In the following description of embodiments, reference is made to the accompanying drawings which form a part hereof, and in which it is shown by way of illustration specific embodiments of the disclosure that can be practiced. It is to be understood that other embodiments can be used and structural changes can be made without departing from the scope of the disclosed embodiments.

The basic principle of the method and system for performing close-loop analysis to electronic component failures of the present disclosure lies in that, due to the similarity in structure and process of each type of electronic component, a fault tree of physics of failure of electronic components can be established for such type of electronic component, and the physical events of the fault tree of physics of failure can be described by conversion of observable events. The observable events can be represented by physical parameters such as electrical properties, thermal properties, mechanical properties, the appearance characteristics, and hermeticity, etc. Consequently, a fault dictionary with a single failure mechanism cause corresponding to failure characteristics of a node is established. If the collected failure characteristic vector is the same as a row characteristic vector of a failure mechanism of the fault dictionary, then the mechanism cause of the failure mode is determined. Further, improvements are proposed directed to the mechanism factor and influencing factor, so as to perform close-loop analysis with "accurate locating, clear mechanism, and effective measures".

Figure 1:
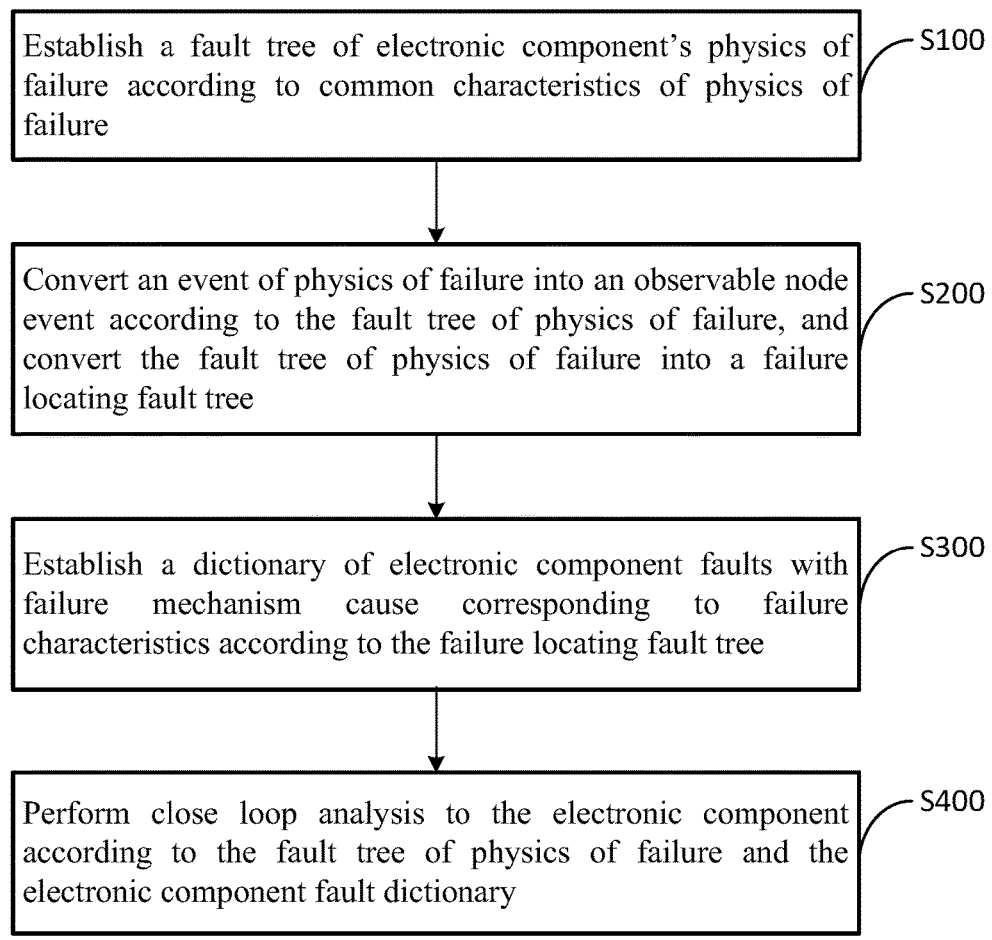
FIG. 1 is a flowchart showing a method for performing close-loop analysis to electronic component failures according to an embodiment of the disclosure.
Figure 2:
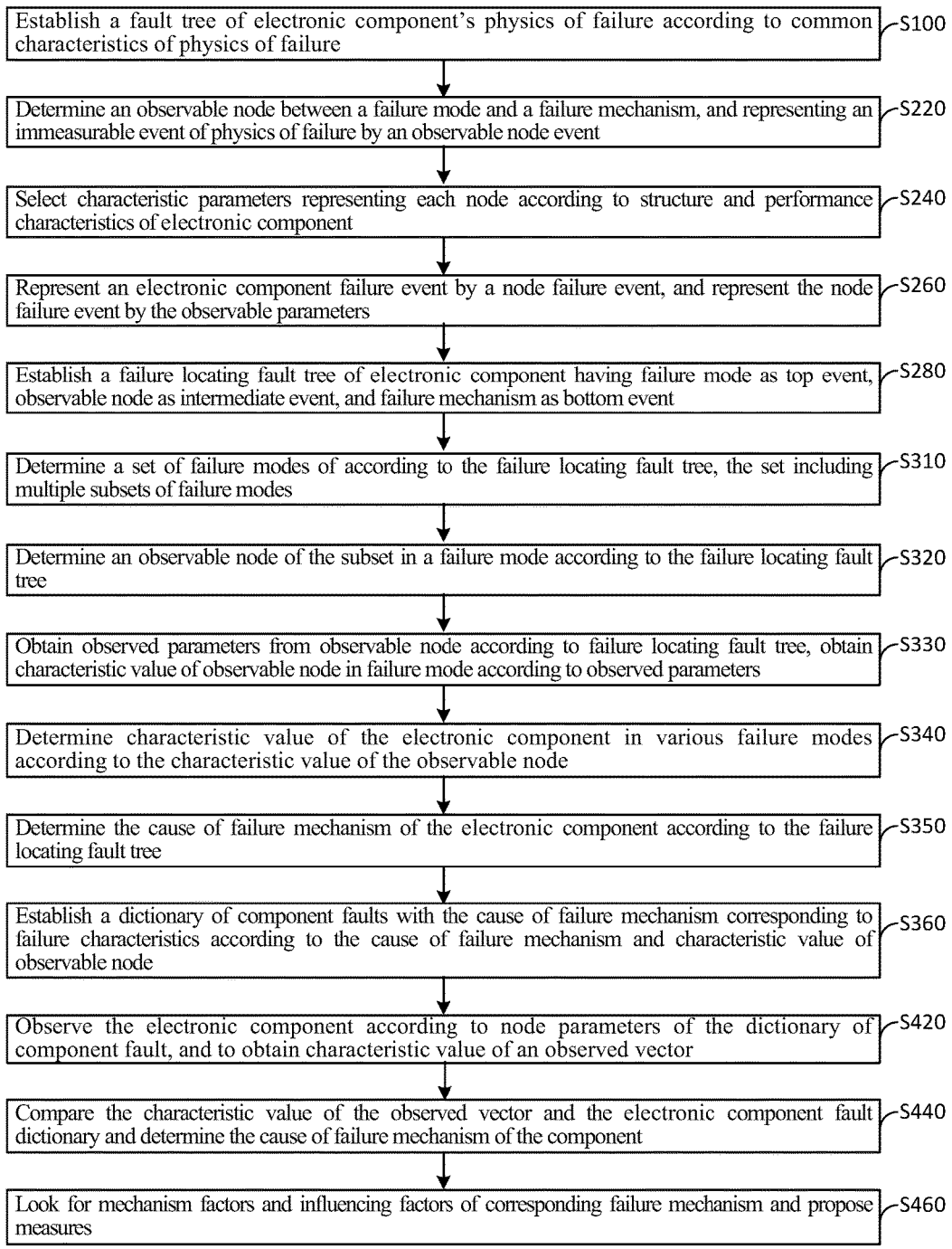
FIG. 2 is a detailed flowchart showing a method for performing close-loop analysis to electronic component failures according to an embodiment of the disclosure.

As shown in FIGS. 1 and 2, a method for constructing electronic component fault tree based on physics of failure includes the following steps.

Step S100: establishing, according to common characteristics of electronic component's physics of failure, a fault tree of electronic component's physics of failure.

Due to the similarity in structure and process of each type of electronic components, the fault tree of physics of failure can be established in accordance with the common characteristics of physics of failure of such electronic component.

In one embodiment, the common characteristics of electronic components include fault object, failure mode, failure site, failure mechanism, mechanism factor, and influencing factor. Such six common characteristics can completely and comprehensively cover the fault features and failure causes of the electronic components. After finishing arranging the six common characteristics, a fault tree of physics of failure of electronic components can be established respectively in six layers of events: fault object, failure mode, failure site, failure mechanism, mechanism factor, and influencing factor.

In this fault tree of physics of failure, according to the relevance of the physics of failure of electronic components, the relevance of events between the upper and lower grades of fault object, failure mode, failure site, and failure mechanism is an "OR" gate. The structural function of the "OR" gate of the events between the upper and lower grades is $$\Phi(\vec{X}) = \bigcup_{1}^{n} x_i,$$

wherein $\Phi$ is the status of the event of upper grade, and x is the status of the event of lower grade; if the event xi of lower grade happens, then the value will be 1, otherwise it will be 0. The structural function describing the occurrence status $\Phi$ of the upper event can be $$\Phi(\vec{X}) = 1 - \prod_{1}^{n}(1 - x_i),$$

and if the event happens, then the value will be 1, otherwise it will be 0. This structural function means that the event of the upper grade will happen if only an event of lower grade happens. Meanwhile, the relevance of events between the upper and lower grades of failure mechanism, mechanism factor and influencing factor is an "OR" gate or "AND" gate, wherein the structural function of the "AND" gate is $$\Phi(\vec{X}) = \bigcap_{1}^{n} x_i,$$

and if the event xi of lower grade happens, then the value will be 1, otherwise it will be 0. The structural function describing the occurrence status $\Phi$ of the upper event is $$\Phi(\vec{X}) = \prod_{1}^{n} x_i,$$

and if the event happens, then the value will be 1, otherwise it will be 0. This structural function means that the event of the upper grade will happen only if all events of lower grade happen. Physical events of each layer from the second to the sixth layer of the fault tree can be decomposed into events of 1 to 3 grades, forming a fault tree of various electronic components with n grades and of six physical layers, and it is easy to understand that the minimum of n is 6.

Step S200: converting an event of physics of failure into an observable node event according to the fault tree of physics of failure, and converting the fault tree of physics of failure into a failure locating fault tree.

In one embodiment, Step S200 further includes:

Step S220: determining an observable node between a failure mode and a failure mechanism, and representing an immeasurable event of physics of failure by an observable node event;

Step S240: selecting, according to the structure and performance characteristics of the electronic component, characteristic parameters representing each node, the characteristic parameters being observable parameters, the observable parameters including: electrical properties, thermal properties, mechanical properties, the appearance characteristics, hermeticity, and environmental adaptation;

Step S260: representing an electronic component failure event by a node failure event, and representing the node failure event by the observable parameters; and Step S280: establishing a failure locating fault tree of electronic component, the fault tree having the failure mode as top event, the observable node as intermediate event, and the failure mechanism as bottom event.

Step S300: establishing, according to the failure locating fault tree, a dictionary of electronic component faults with failure mechanism cause corresponding to failure characteristics.

In one embodiment, Step S300 further includes:

Step S310: determining, according to the failure locating fault tree, a set of failure modes of the electronic component, the set including multiple subsets of failure modes;

Step S320: determining, according to the failure locating fault tree, an observable node of the subset of a failure mode;

Step S330: obtaining, according to the failure locating fault tree, observed parameters from the observable node, and obtaining a characteristic value of the observable node in the failure mode according to the observed parameter;

Step S340: determining, according to the characteristic value of the observable node, characteristic vector of the electronic component in various failure modes;

Step S350: determining, according to the failure locating fault tree, the cause of failure mechanism of the electronic component; and Step S360: establishing, according to the cause of failure mechanism and the characteristic value of the observable node, a dictionary of electronic component faults with the cause of failure mechanism corresponding to failure characteristics.

Step S400: performing close-loop analysis to the electronic component according to the fault tree of physics of failure and the electronic component fault dictionary.

In one embodiment, Step S400 further includes:

Step S420: observing the electronic component according to the node parameter of the electronic component fault dictionary, and obtaining a characteristic value of an observed vector;

Step S440: comparing the characteristic value of the observed vector and the electronic component fault dictionary, and determining the cause of failure mechanism of the electronic component; and Step S460: looking for, according to the cause of failure mechanism, the mechanism factors and influencing factors corresponding to the failure mechanism in the fault tree of physics of failure, so as to propose control measures against the failure mechanism.

By the method for performing close-loop analysis to electronic component failures of the present disclosure, it is possible to locate the electronic component fault in the internal physical structure by the failure locating fault tree, to give a clear failure path, to quickly identify the failure mechanism corresponding to the electronic component failure mode by comparing the failure characteristic vector of the fault dictionary, and to determine the mechanism factors and influencing factors of relevant failure mechanism by the fault tree of physics of failure. Thus, targeted failure control measures are proposed to achieve fast and accurate locating and diagnosis to the failures of electronic component.

To better illustrate the method for performing close-loop analysis to electronic component failures of the disclosure, an example of close-loop analysis of "electrical parameter drift" of hybrid integrated circuit (HIC) will be further described to illustrate the technical solution and the beneficial effect brought.

Step 1, establishing a fault tree of physics of failure of hybrid integrated circuit.

Establish a fault tree of physics of failure for a failure mode according to the characteristics of "electrical parameter drift" physics of failure of hybrid integrated circuit.

Establish a fault tree of physics of failure of hybrid integrated circuit in six layers of events: fault object, failure mode, failure site, failure mechanism, mechanism factor, and influencing factor. In this fault tree of physics of failure, logical relation between events of the first, second, third and fourth layers are "OR" gate, and logical relation between events of the fourth, fifth and sixth layers are "OR" gate and "AND" gate. The fault tree of physics of failure has sixth layers of physics of failure and events of eight grades in total.

Step 2, converting the fault tree of physics of failure into a failure locating fault tree.

Convert the fault tree of physics of failure established in Step 1 into a failure locating fault tree having failure mechanism as the bottom event.

Firstly, regarding the established fault tree of physics of failure of hybrid integrated circuit, between the failure object top events and the failure mechanisms, converting the event of physics of failures that cannot be measured directly including immeasurable degradation of electronic component welding/soldering, and degradation of wire bonding point into one or more measurable and observable node events including: thermal resistance of the electronic component is too high, wire bonding strength fails to reach the standard, clear IMC on the interface, etc., which are the intermediate events of the failure locating fault tree.

The node events can be represented by some failure characteristic parameters including junction temperature Tj, bonding strength, the interface IMC, moisture content, etc.

The converted failure locating fault tree of "electrical parameter drift" of hybrid integrated circuit is a failure locating fault tree containing 15 failure mechanism causes and 8 grades of events.

Step 3, establishing a dictionary of electronic component faults of electrical parameter drift of hybrid integrated circuit.

Establish a dictionary of electronic component faults with failure mechanisms corresponding to failure characteristics according to the failure locating fault tree established in Step 2.

Determine 23 observable nodes and their characteristic parameters for the electrical parameter drift failure mode of HIC. The node characteristic parameters representing that internal component failure causes HIC parameters drift includes: component parameter drift, component internal microcrack, internal ESD damage in a semiconductor device, and Semiconductor chip surface contamination and leakage, BGA solder joints within the solder layer fatigue of LSIC, etc. The node characteristic parameters representing that electronic assembly failure causes HIC parameter drift includes: component welding/soldering thermal resistance, bonding interface IMC and bonding point corrosion, etc. The node characteristic parameters representing that insulation degradation causes HIC parameter drift includes: insulation resistance between pin/housing, and insulation resistance between joints, etc. The node failure characteristic parameters are $X_1=\{X_{1,1}, X_{1,2}, \ldots, X_{1,23}\}$.

Based on the node failure characteristic parameters of $X_1=\{X_{1,1}, X_{1,2}, \ldots, X_{1,23}\}$, the corresponding characteristic value ($F_{1,j}$) and the failure characteristic value (1 or 0) can be obtained by the following equation according to the range of $X_1$, so as to obtain the failure characteristic vector of a failure mechanism $M_{1,j}=\{F_{1,1}, F_{1,2}, \ldots, F_{1,23}\}$. The range of sp refers to the qualified criteria of relevant standards of HIC and the electronic components, namely the observed range of each node.

$$F_{i,j} = \begin{cases} 1 & X_{i,j} \notin sp \\ 0 & X_{i,j} \in sp \end{cases}$$

There are 15 failure mechanisms for electrical parameter drift of HIC, and the set of the mechanism is $M_{1,j}=\{M_{1,1}, M_{1,2}, \ldots, M_{1,15}\}$. According to the logical relationship between the node events of the failure locating fault tree of electrical parameter drift, corresponding relationships between each observed node failure feature and failure mechanism are given in the following list.

A fault dictionary of the electrical parameter drift mode of HIC is established based on the corresponding relationships between each observed node failure characteristic and failure mechanism. See Table 1: Fault dictionary of HIC "electrical parameter drift" (M1). In the Table 1, $M_{1,1}\sim M_{1,15}$ indicate the causes of HIC "electric parameter drift" ($M_1$), respectively, and there are 15 kinds of failure mechanism. $F_{1,1}\sim F_{1,23}$ represents 23 testable node failure characteristics. For example, $M_{1,1}$ represents the failure mechanism that the internal chip is degraded or overrun leading to HIC "electric parameter drift". $M_{1,8}$ represents the failure mechanism that the thermal resistance increases and the junction temperature raise of the internal chip that lead to HIC "electrical drift". $F_{1,1}$ represents that the first testable failure characteristic is the HIC electrical parameter drift, $F_{1,1}$ represents that the second testable failure characteristic is the internal chip's electrical parameter drift, $F_{1,7}$ represents that the seventh testable failure characteristic is the thermal resistance increases of the internal chip, $F_{1,15}$ represents that the fifteenth testable failure characteristic is the adhesive layer microcracks of the internal chip, $F_{1,22}$ represents that the twenty-second testable failure characteristic is the shear strength decrease of the internal chip. So, it can be seen from the table 1 that when $\{F_{1,1}, F_{1,2}, F_{1,3}\}=1$ and $\{F_{1,4}\sim F_{2,23}\}=0$, it indicates that the failure mechanism ($M_{1,1}$) caused the "electrical parameter drift", when $\{F_{1,1}, F_{1,2}, F_{1,7}, F_{1,5}, F_{1,22}\}=1$ and $\{F_{1,3}\sim F_{1,6}, F_{1,8},\sim F_{1,14}, F_{1,6},\sim F_{1,21}, F_{1,22}\}=0$, it indicates that the failure mechanism ($M_{1,8}$) caused the "electrical parameter drift".

TABLE 1

| the cause of mechanism | characteristic vector | | | | | | | | | | | |
|---|---|---|---|---|---|---|---|---|---|---|---|---|
| | $F_{1,1}$ | $F_{1,2}$ | $F_{1,3}$ | $F_{1,4}$ | $F_{1,5}$ | $F_{1,6}$ | $F_{1,7}$ | $F_{1,8}$ | $F_{1,9}$ | $F_{1,10}$ | $F_{1,11}$ | $F_{1,12}$ |
| $M_{1,1}$ | 1 | 1 | 1 | 0 | 0 | 0 | 0 | 0 | 0 | 0 | 0 | 0 |
| $M_{1,2}$ | 1 | 1 | 0 | 1 | 0 | 0 | 0 | 0 | 0 | 0 | 0 | 0 |
| $M_{1,3}$ | 1 | 1 | 0 | 0 | 1 | 0 | 0 | 0 | 0 | 0 | 0 | 0 |
| $M_{1,4}$ | 1 | 1 | 0 | 0 | 0 | 1 | 0 | 0 | 0 | 0 | 1 | 0 |
| $M_{1,5}$ | 1 | 1 | 0 | 0 | 0 | 1 | 0 | 0 | 0 | 0 | 0 | 1 |
| $M_{1,6}$ | 1 | 1 | 0 | 0 | 0 | 0 | 1 | 0 | 0 | 0 | 0 | 0 |
| $M_{1,7}$ | 1 | 1 | 0 | 0 | 0 | 1 | 0 | 0 | 0 | 0 | 0 | 0 |
| $M_{1,8}$ | 1 | 1 | 0 | 0 | 0 | 0 | 1 | 0 | 0 | 0 | 0 | 0 |
| $M_{1,9}$ | 1 | 1 | 0 | 0 | 0 | 1 | 0 | 0 | 0 | 0 | 0 | 0 |
| $M_{1,10}$ | 1 | 1 | 0 | 0 | 0 | 0 | 0 | 0 | 0 | 0 | 0 | 0 |
| $M_{1,11}$ | 1 | 1 | 0 | 0 | 0 | 0 | 0 | 0 | 0 | 0 | 0 | 0 |
| $M_{1,12}$ | 1 | 1 | 0 | 0 | 0 | 0 | 0 | 0 | 0 | 0 | 0 | 0 |
| $M_{1,13}$ | 1 | 1 | 0 | 0 | 0 | 0 | 0 | 1 | 0 | 0 | 0 | 0 |
| $M_{1,14}$ | 1 | 1 | 0 | 0 | 0 | 0 | 0 | 0 | 1 | 0 | 0 | 0 |
| $M_{1,15}$ | 1 | 1 | 0 | 0 | 0 | 0 | 0 | 0 | 0 | 1 | 0 | 0 |

| the cause of mechanism | characteristic vector | | | | | | | | | | |
|---|---|---|---|---|---|---|---|---|---|---|---|
| | $F_{1,13}$ | $F_{1,14}$ | $F_{1,15}$ | $F_{1,16}$ | $F_{1,17}$ | $F_{1,18}$ | $F_{1,19}$ | $F_{1,20}$ | $F_{1,21}$ | $F_{1,22}$ | $F_{1,23}$ |
| $M_{1,1}$ | 0 | 0 | 0 | 0 | 0 | 0 | 0 | 0 | 0 | 0 | 0 |
| $M_{1,2}$ | 0 | 0 | 0 | 0 | 0 | 0 | 0 | 0 | 0 | 0 | 0 |
| $M_{1,3}$ | 0 | 0 | 0 | 0 | 0 | 0 | 0 | 0 | 0 | 0 | 0 |
| $M_{1,4}$ | 0 | 0 | 0 | 0 | 0 | 0 | 0 | 0 | 0 | 0 | 0 |
| $M_{1,5}$ | 0 | 0 | 0 | 0 | 0 | 0 | 0 | 0 | 0 | 0 | 0 |
| $M_{1,6}$ | 1 | 0 | 0 | 0 | 0 | 0 | 0 | 0 | 0 | 0 | 0 |
| $M_{1,7}$ | 0 | 1 | 0 | 0 | 0 | 0 | 0 | 0 | 0 | 0 | 0 |
| $M_{1,8}$ | 0 | 0 | 1 | 0 | 0 | 0 | 0 | 0 | 0 | 1 | 0 |
| $M_{1,9}$ | 0 | 0 | 0 | 1 | 0 | 0 | 0 | 0 | 0 | 1 | 0 |
| $M_{1,10}$ | 0 | 0 | 0 | 0 | 1 | 0 | 0 | 0 | 0 | 0 | 1 |
| $M_{1,11}$ | 0 | 0 | 0 | 0 | 0 | 1 | 0 | 0 | 0 | 0 | 1 |

TABLE 1-continued

| | | | | | | | | | | | |
|---|---|---|---|---|---|---|---|---|---|---|---|
| $M_{1,12}$ | 0 | 0 | 0 | 0 | 0 | 1 | 0 | 0 | 0 | 0 | 1 |
| $M_{1,13}$ | 0 | 0 | 0 | 0 | 0 | 0 | 1 | 0 | 0 | 0 | |
| $M_{1,14}$ | 0 | 0 | 0 | 0 | 0 | 0 | 0 | 1 | 0 | 0 | |
| $M_{1,15}$ | 0 | 0 | 0 | 0 | 0 | 0 | 0 | 0 | 1 | 0 | |

Step 4, performing close-loop analysis to the electrical parameter drift according to the fault tree and fault dictionary.

Perform close-loop analysis to the electrical parameter drift of hybrid integrated circuit according to the fault dictionary established in Step 3 and the fault tree of physics of failure established in Step 1.

According to the node parameters of the fault dictionary, the hybrid integrated circuit is observed, and the characteristic value of the characteristic vector $F_{i,1}=\{F_{1,1}, F_{1,2}, \ldots, F_{1,23}\}$ is compared with the fault dictionary. If the characteristic value is the same to a row vector of the fault dictionary, then it can be determined that a failure of corresponding the cause of single mechanism ($M_{i,j}$) has happened to the electronic component. After determining the cause of failure mechanism, the mechanism factors and influencing factors of corresponding the failure mechanism ($M_{i,j}$) is looked up in the fault tree of physics of failure, so as to propose control measures to the failure mechanism.

A close-loop analysis is conducted by applying the above fault tree of electrical parameter drift of HIC and the fault dictionary.

After a high temperature steady life test, the output voltage of a linear power HIC is out of tolerance. Thus, the fault tree and fault dictionary method is used to conduct close-loop analysis to the circuit to find the cause of failure mechanism and determine the failure path, so as to propose control measures.

Upon analysis and observation of the circuit, the failure characteristic ($F_{1,j}$) and the failure characteristic value (1 or 0), $F_{i,1}=\{F_{1,1}, F_{1,2}, \ldots, F_{1,23}\}$ is compared with the fault dictionary of electrical parameter drift failure of Table 1. Considering that the result of the characteristic vector of a chip is the same to the mechanism $M_{1,1}$ of the first row, the failure mechanism $M_{1,1}$ is determined as: electrical parameter drift caused by electronic component degradation or overload usage is the cause of out-of-tolerance output voltage. Based on the fault tree of physics of failure, and considering the high test temperature heat and the allowable junction temperature limit $T_{Mj}$ of the chip, it is determined that the out-of-tolerance output voltage is caused by the electrical parameter drift of the chip due to overrun use of chip junction temperature. Therefore, the failure control measures are to select a chip with higher level of junction temperature limit $T_{Mj}$, and to design and use it in a thermal derating way.

Figure 3:
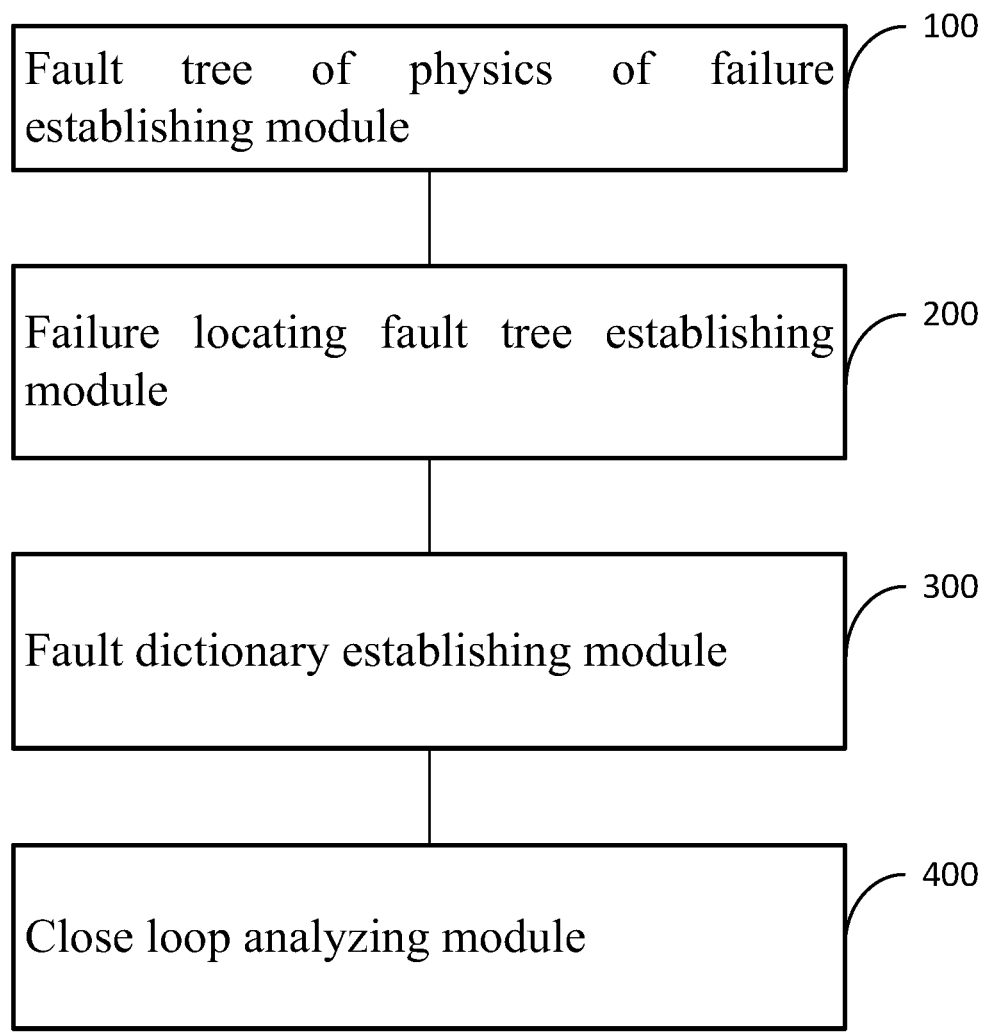
FIG. 3 is a structural schematic diagram showing a system for performing close-loop analysis to electronic component failures according to an embodiment of the disclosure.

As shown in FIG. 3, a system for performing close-loop analysis to electronic component failures includes:

a fault tree of physics of failure establishing module 100, configured to establish, according to common characteristics of electronic component's physics of failure, a fault tree of electronic component's physics of failure;

a failure locating fault tree establishing module 200, configured to convert an event of physics of failure into an observable node event according to the fault tree of physics of failure, and to convert the fault tree of physics of failure into a failure locating fault tree;

a fault dictionary establishing module 300, configured to establish, according to the failure locating fault tree, a dictionary of electronic component faults with the cause of failure mechanism corresponding to failure characteristics; and a close-loop analyzing module 400, configured to perform close-loop analysis of failures to the electronic component according to the fault tree of physics of failure and the electronic component fault dictionary.

By the system for performing close-loop analysis to electronic component failures of the present disclosure, it is possible to locate the electronic component fault in the internal physical structure by the failure locating fault tree, to give a clear failure path, to quickly identify the failure mechanism corresponding to the electronic component failure mode by comparing the failure characteristic vector of the fault dictionary, and to determine the mechanism factors and influencing factors of relevant failure mechanism by the fault tree of physics of failure. Thus, targeted failure control measures are proposed to achieve fast and accurate locating and diagnosis to the electronic component failure.

In one embodiment, the common characteristics of electronic component's physics of failure include: fault object, failure mode, failure site, failure mechanism, mechanism factor, and influencing factor.

Thus, using the six common characteristics, it is possible to completely and comprehensively conduct fault diagnosis and locating of the electronic component. After finishing arranging the six common characteristics, an electronic component fault tree of physics of failure can be established respectively in six layers of events: fault object, failure mode, failure site, failure mechanism, mechanism factor, and influencing factor.

Figure 4:
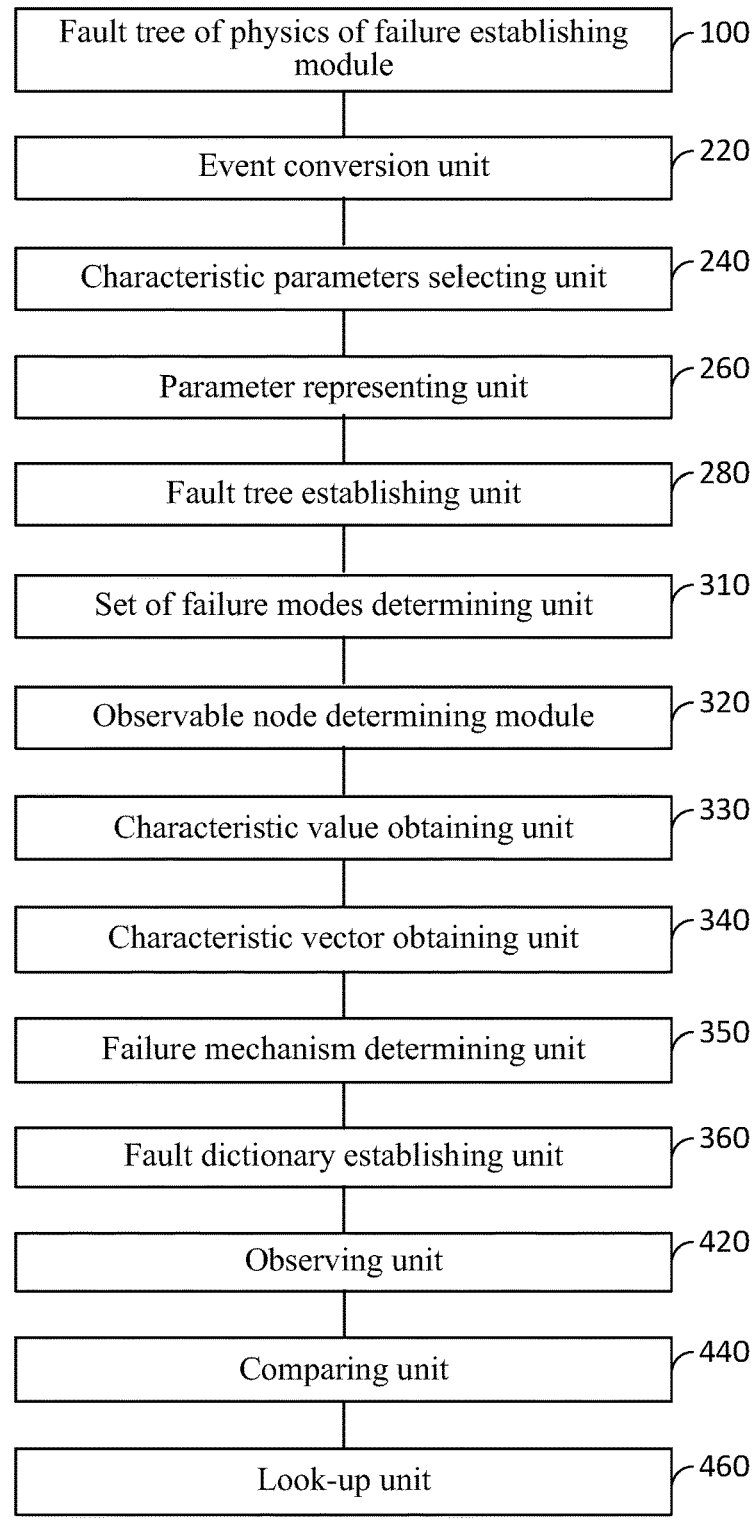
FIG. 4 is a detailed structural schematic diagram showing a system for performing close-loop analysis to electronic component failures according to an embodiment of the disclosure.

As shown in FIG. 4, the failure locating fault tree establishing module 200 further includes:

an event conversion unit 220, configured to determine an observable node between a failure mode and a failure mechanism, and to represent an immeasurable event of physics of failure by an observable node event;

a characteristic parameters selecting unit 240, configured to select, according to the structure and performance characteristics of the electronic component, characteristic parameters representing each node, the characteristic parameters being observable parameters, the observable parameters including: electrical, thermal, and mechanical properties, the appearance characteristics, hermeticity, and environmental adaptation;

a parameter representing unit 260, configured to represent an electronic component failure event by a node failure event, and to represent the node failure event by the observable parameters; and a fault tree establishing unit 280, configured to establish an failure locating fault tree of an electronic component, the fault tree having the failure mode as top event, the observable node as intermediate event, and the failure mechanism as bottom event.

As shown in FIG. 4, the fault dictionary establishing module 300 further includes:

a set of failure modes determining unit 310, configured to determine, according to the failure locating fault tree, a set of failure modes of the electronic component, the set including multiple subsets of failure modes;

an observable node determining module 320, configured to determine, according to the failure locating fault tree, an observable node of the subset of failure modes in a failure mode;

a characteristic value obtaining unit 330, configured to obtain, according to the failure locating fault tree, observed parameters from the observable node, and to obtain a characteristic value of the observable node in the failure mode according to the observed parameters;

a characteristic vector obtaining unit 340, configured to determine, according to the characteristic value of the observable node, a characteristic vector of the electronic component in various failure modes;

a failure mechanism determining unit 350, configured to determine, according to the failure locating fault tree, the failure mechanism cause of the electronic component; and a fault dictionary establishing unit 360, configured to establish, according to the failure mechanism cause and the characteristic value of the observable node, a dictionary of electronic component faults with failure mechanism cause corresponding to failure characteristics.

As shown in FIG. 4, the close-loop analyzing module 400 further includes:

an observing unit 420, configured to observe the electronic component according to the node parameters of the electronic component fault dictionary, and to obtain a characteristic value of an observed vector;

a comparing unit 440, configured to compare the characteristic value of the observed vector and the electronic component fault dictionary, and to determine the failure mechanism cause of the electronic component; and a look-up unit 460, configured to look for, according to the failure mechanism cause, the mechanism factors and influencing factors corresponding to the failure mechanism in the fault tree of physics of failure, so as to propose measures against the failure mechanism.

Based on the above, by the method and system for performing close-loop analysis to electronic component failures of the present disclosure, it is possible to locate the electronic component fault in the internal physical structure by the failure locating fault tree, to give a clear failure path, to quickly identify the failure mechanism corresponding to the electronic component failure mode by analysis of failure characteristic vector of the fault dictionary, and to determine the mechanism factors and influencing factors of relevant failure mechanism by the fault tree of physics of failure. Thus, targeted failure control measures can be proposed to achieve fast and accurate locating and diagnosis to the electronic component failure, meeting the requirements of "accurate locating, clear mechanism, and effective measures".

The embodiments are chosen and described in order to explain the principles of the disclosure and their practical application so as to allow others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A system for performing close-loop analysis to an electronic component fault problem, comprising:

a fault tree of physics of failure establishing module, configured to establish, according to common characteristics of electronic component's physics of failure, a fault tree of physics of failure of the electronic component;

a failure locating fault tree establishing module, configured to convert an event of physics of failure into an observable node event, according to the fault tree of physics of failure, and to convert the fault tree of physics of failure into a failure locating fault tree;

a fault dictionary establishing module, configured to establish, according to the failure locating fault tree, an electronic component fault dictionary with a cause of failure mechanism corresponding to failure characteristics; and a close-loop analyzing module, configured to perform close-loop analysis to an electronic component fault problem, according to the fault tree of physics of failure and the electronic component fault dictionary;

wherein the fault dictionary establishing module further comprises:

a set of failure modes determining unit, configured to determine, according to the failure locating fault tree, a set of failure modes of the electronic component, the set of failure modes including multiple subsets of failure modes;

an observable node determining unit, configured to determine, according to the failure locating fault tree, an observable node for each failure mode in the subset of failure modes;

a characteristic value obtaining unit, configured to obtain, according to the failure locating fault tree, observable parameters from the observable node, and analyzing the observable parameters to obtain characteristic value of the observable node in a failure mode;

a characteristic vector obtaining unit, configured to determine, according to the characteristic value of the observable node, a characteristic vector of the electronic component in various failure modes;

a failure mechanism determining unit, configured to determine, according to the failure locating fault tree, the cause of failure mechanism of the electronic component; and a fault dictionary establishing unit, configured to establish, according to the cause of failure mechanism and the characteristic value of the observable node, the electronic component fault dictionary with the cause of failure mechanism corresponding to failure characteristics of a node event.

2. The system of claim 1, wherein the common characteristics of electronic component's physics of failure comprises fault object, failure mode, failure site, failure mechanism, mechanism factor, and influencing factor.

3. The system of claim 1, wherein the failure locating fault tree establishing module further comprises:

an event converting unit, configured to determine the observable node between the failure mode and the failure mechanism, and to represent an event of physics of failure that cannot be measured directly, by the observable node event;

a characteristic parameters selecting unit, configured to select, according to structure and performance characteristics of the electronic component, the observable parameters representing each node, including electrical, thermal, and mechanical properties, appearance characteristics, hermeticity, and environmental adaptation;

a parameter representing unit, configured to represent an electronic component failure event by a node failure event, and to represent the node failure event by the observable parameters; and a fault tree establishing unit, configured to establish the failure locating fault tree of the electronic component, the failure locating fault tree having the failure mode as a top event, the observable node as an intermediate event, and the failure mechanism as a bottom event.

4. The system of claim 1, wherein the close-loop analyzing module further comprises:

an observing unit, configured to observe the electronic component, according to node parameters of the electronic component fault dictionary, and to obtain characteristic value of an observed vector;

a comparing unit, configured to compare the characteristic value of the observed vector and the electronic component fault dictionary, then to determine the cause of failure mechanism of the electronic component; and a look-up unit, configured to look for, according to the cause of failure mechanism, mechanism factors and influencing factors of corresponding failure mechanism in the fault tree of physics of failure, so as to propose measures against a failure mechanism.

\* \* \* \* \*